(12) United States Patent
Bove et al.

(10) Patent No.: US 6,857,738 B1
(45) Date of Patent: Feb. 22, 2005

(54) SPECTACLES

(76) Inventors: Nelson David Bove, 4550 Walton Creek, Cincinnatti, OH (US) 45243; Steven Benjamin Walmsley, 7256 Green Farm, West Bloomfield, MI (US) 48322

( * ) Notice: Subject to any disclaimer, the term of this patent is extended or adjusted under 35 U.S.C. 154(b) by 10 days.

(21) Appl. No.: 10/664,136

(22) Filed: Sep. 17, 2003

(51) Int. Cl.[7] .............................................. G02C 5/22
(52) U.S. Cl. ........................ 351/153; 351/113; 16/228
(58) Field of Search ................................ 351/113, 114, 351/153; 16/228

(56) References Cited

U.S. PATENT DOCUMENTS

| | | | |
|---|---|---|---|
| 2,608,905 A | 9/1952 | Nelson | |
| 3,899,840 A | 8/1975 | Maillet | |
| 3,923,384 A | * 12/1975 | Leblanc | ...................... 351/113 |
| 5,035,499 A | 7/1991 | Kitamura et al. | |
| 5,426,473 A | 6/1995 | Riehm | |
| 6,196,682 B1 | 3/2001 | Walmsley et al. | |
| 6,425,664 B1 | 7/2002 | Liu et al. | |
| 6,543,895 B2 | 4/2003 | Fukai | |
| 6,568,805 B1 | 5/2003 | Dietz | |
| 6,679,604 B1 | * 1/2004 | Bove et al. | .................. 351/153 |

* cited by examiner

Primary Examiner—Huy Mai (57) ABSTRACT

Spectacles include a lens frame having a shoulder, and further include a temple arm pivotably mounted to the shoulder of the lens frame. The temple arm includes an inboard side, an outboard side, and a detent end having a detent. A pawl is pivotably mounted to the shoulder of the lens frame and includes an inboard portion that is adapted for contact with the inboard side of the temple arm. The pawl further includes a temple arm detent portion that is adapted for engagement with the detent of the temple arm to lock the temple arm against the lens frame in a locked position, whereby the temple arm establishes a predetermined load on the lens frame for pinching an item therebetween.

8 Claims, 8 Drawing Sheets

SPECTACLES

BACKGROUND

The present invention relates generally to eyewear and more particularly to hinge related apparatuses for spectacles. Spectacles typically include a lens frame having two rims, each holding a lens, and further include two temple arms, each on opposite lateral sides of the lens frame and attached by respective hinge portions. The hinge portions enable a wearer of the spectacles to pivot the temple arms from an open position as worn on the face, to a closed position for storing the spectacles. Unfortunately, however, conventional spectacle designs provide no reliable and attractive means for clipping spectacles to an article for storage and safekeeping.

SUMMARY

An embodiment of the present invention includes spectacles having a lens frame with a shoulder, and further having a temple arm pivotably mounted to the shoulder of the lens frame. The temple arm includes an inboard side, an outboard side, and a detent end having a detent. A pawl is pivotably mounted to the shoulder of the lens frame and includes an inboard portion that is adapted for contact with the inboard side of the temple arm. The pawl further includes a temple arm detent portion that is adapted for engagement with the detent of the temple arm to lock the temple arm against the lens frame in a locked position, whereby the temple arm establishes a predetermined load on the lens frame for pinching an item therebetween.

BRIEF DESCRIPTION OF THE SEVERAL VIEWS OF THE DRAWINGS

Features and advantages of the present invention will become apparent to those skilled in the art from the following description with reference to the drawings, in which.

DETAILED DESCRIPTION

Referring now in detail to the Figures, there is shown in FIGS. 1 through 5, spectacles 10 according to a first embodiment of the present invention. The spectacles 10 include a lens frame 12, a temple arm 14 pivotably mounted to the lens frame 10, and a pawl 16 pivotably mounted to the lens frame 12. The pawl 16 is adapted to automatically fall into detent engagement with the temple arm 14 as the temple arm 14 is swung closed toward, and compressed against, the lens frame 12. More specifically, the pawl 16 is adapted to snap into detent engagement with the temple arm 14 under a spring load in the pawl 16 that is created by the closing action of the temple arm 14 against the lens frame 12.

Figure 1:
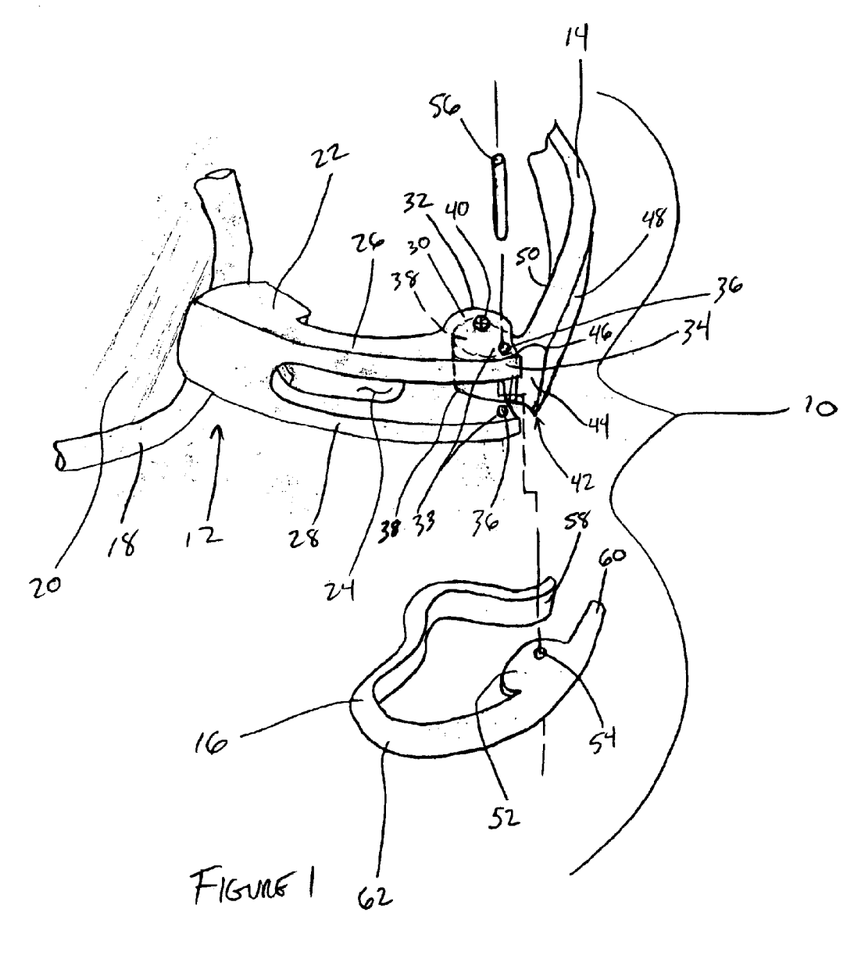
FIG. 1 is a partially exploded perspective view of spectacles according to one embodiment of the present invention.

The lens frame 12 may be composed of metal, plastic, or the like and includes a rim 18, a lens 20 mounted within the rim 18, and a shoulder 22 extending in an outboard direction from the rim 18. Although only one side of the spectacles 10 is shown in the Figures, it is to be understood that the spectacles 10 are generally symmetrical and include an opposite side that may or may not also include the novel and unobvious aspects of the present invention. The shoulder 22 may be a separate portion that is welded to the rim 18, or may integrally extend from the rim 18, or the like. The shoulder 22 includes an aperture 24 that extends transversely therethrough and that defines upper and lower flanges 26, 28. The shoulder 22 further includes a temple hinge portion 30 proximate a generally inboard or rearward side 32 of the shoulder 22 and further includes a pawl pivot portion 33 proximate a generally outboard or forward side 34 of the shoulder 22 that is generally distal with respect to the rim 18. The pawl pivot portion 33 includes apertures 36 through the upper and lower flanges 26, 28.

The temple arm 14 may be composed of metal, plastic, or the like and includes a shoulder hinge portion 38 pivotably mounted to the temple hinge portion 30 of the shoulder 22 of the lens frame 12. A screw, shaft, or any other type of hinge pin 40 connects the temple arm 14 to the lens frame 12. Alternatively, such a separate hinge member is not necessary to pivotably mount the temple arm 14 to the lens frame 12. Rather, the temple arm 14 may be integrally pivotably mounted to the lens frame 12 if desired. In any case, the temple arm 14 also includes detent end 42 having a detent 44 formed therein and at least partially defined by a protrusion or projection 46. The temple arm 14 further includes an outboard side 48 of the temple arm 14 and an inboard side 50 of the temple arm 14.

The pawl 16 is preferably composed of a resilient metal such as spring steel, but may also be composed of other metal, plastic, and the like. The pawl 16 includes a shoulder pivot portion 52 having a hole 54 therethrough and that pivotably mounts to the pawl pivot portion 33 of the lens frame 12. The pawl 16 is mounted to the lens frame 12 using a pivot pin 56. Alternatively, such a separate pivot member is not necessary to pivotably mount the pawl 16 to the lens frame 12. Rather, the pawl 16 may be integrally pivotably mounted to the lens frame 12 if desired. In any case, the pawl 16 is generally C-shaped or U-shaped and also includes an inboard portion 58 at one end, a temple detent portion 60 at an opposite end, and a thumb release portion 62 therebetween. The pawl 16 mounts through the aperture 24 in the shoulder 22 of the lens frame 12, such that the inboard portion 58 is inserted rearwardly through the aperture 24 to the inboard side of the temple arm 14.

Figure 2:
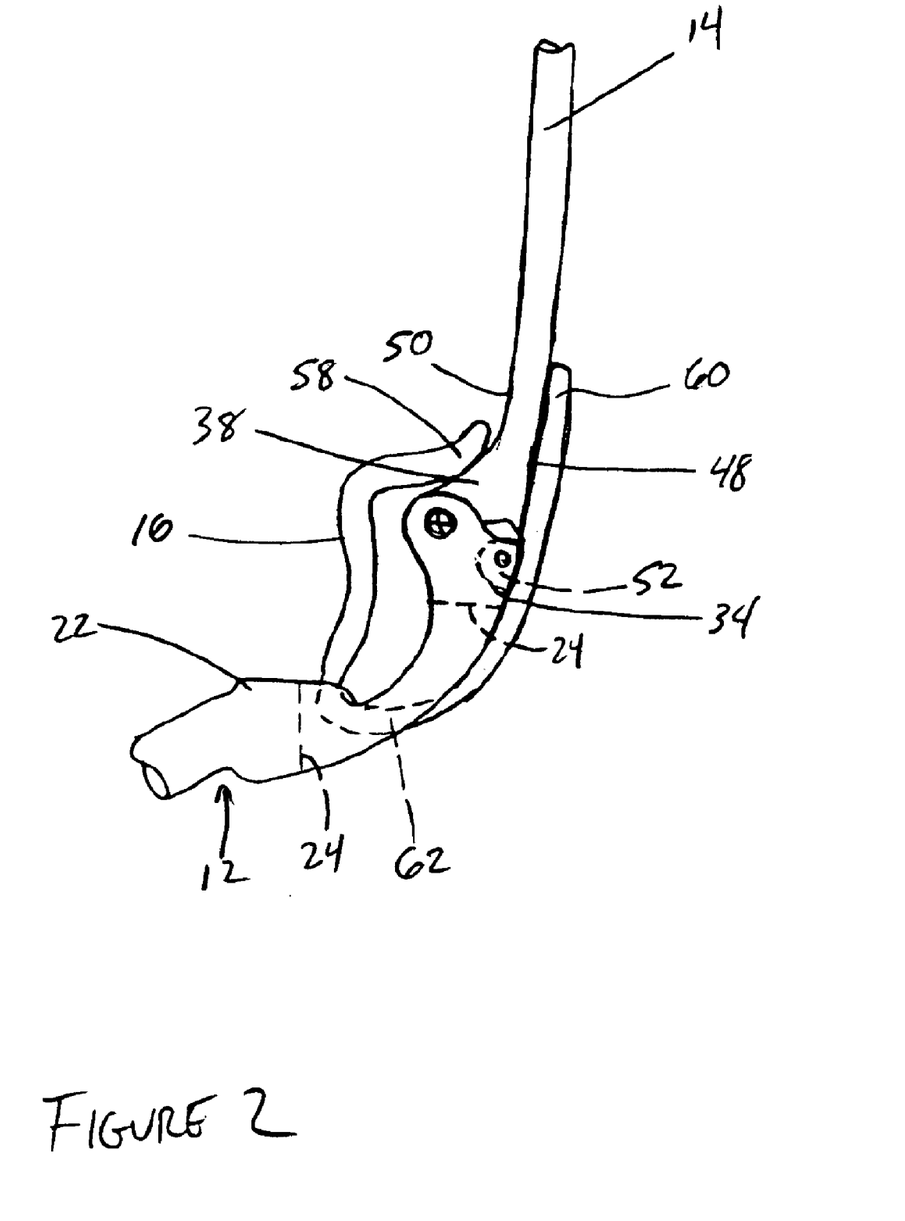
FIG. 2 is a plan view of the spectacles of FIG. 1, illustrating a temple arm in an open position with respect to a lens frame.

FIG. 2 illustrates the temple arm 14 in a substantially open position with respect to the lens frame 12. The pawl 16 originates in the form of the inboard portion 58 that rests on the inboard side 50 of the temple arm 14. The inboard side 50 of the temple arm 14 is at least partially defined by the shoulder hinge portion 38 of the temple arm 14. In any case, the pawl 16 extends in a direction generally forward from the inboard portion 58 toward the lens frame 12 and bends and transitions into the thumb release portion 62 that is disposed at least partially through the aperture 24 of the shoulder 22 of the lens frame 12. The pawl 16 extends in a direction generally rearward from the thumb release portion 62 and terminates in the form of the temple detent portion 60. The portion of the pawl 16 that extends between the temple detent portion 60 and the thumb release portion 62 is shown mounted flush against the outboard side 48 of the temple arm 14 and the outboard side 34 of the shoulder 22. Also between the temple detent and thumb release portions 60, 62, there is formed the shoulder pivot portion 52 shown in hidden lines.

Figure 3:
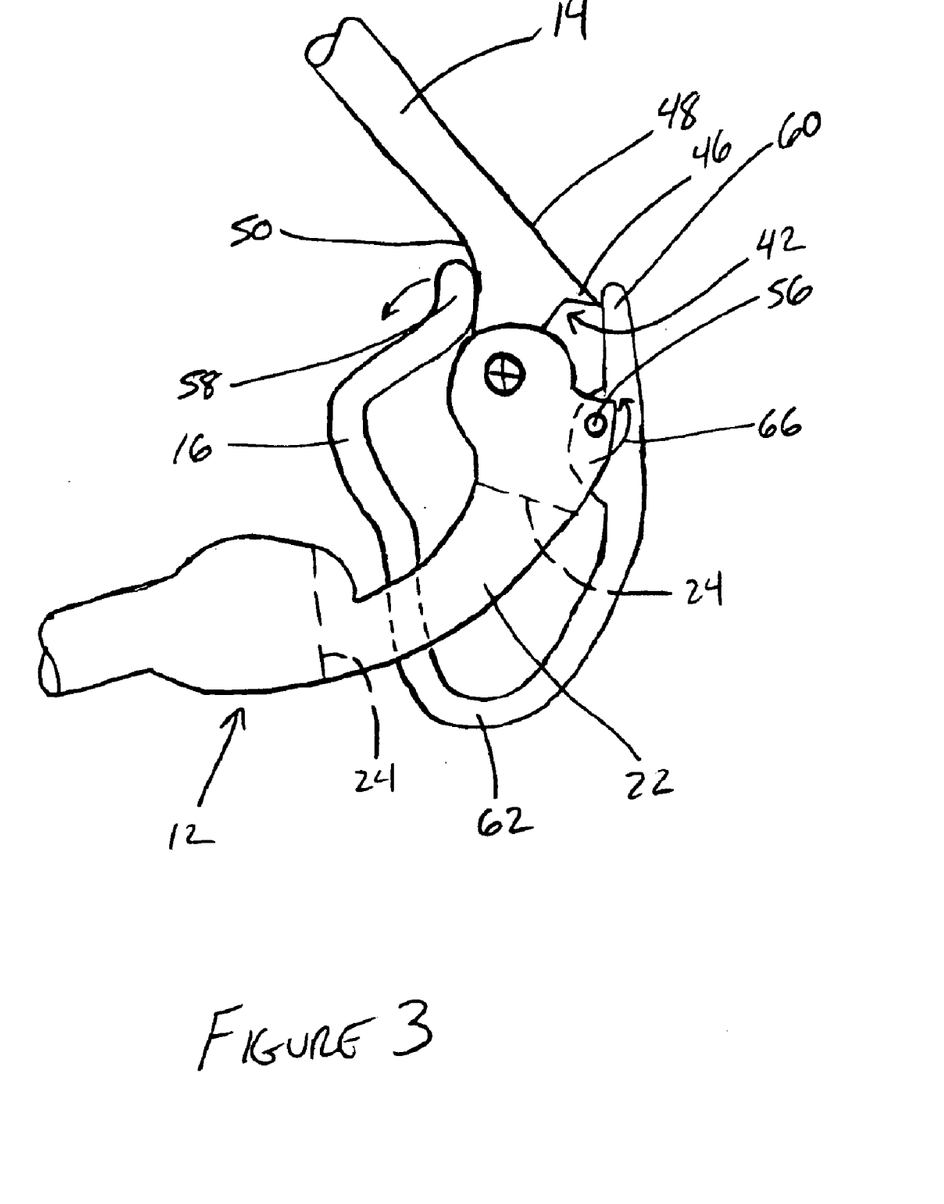
FIG. 3 is a plan view of the spectacles of FIG. 2, illustrating the temple arm being closed towards the lens frame.

FIG. 3 illustrates the temple arm 14 being pivoted from the substantially open position of FIG. 2, toward the lens frame 12. As the temple arm 14 pivots, the inboard side 50 of the temple arm 14 displaces the inboard portion 58 of the pawl 16, thereby causing the pawl 16 to pivot about the pawl pivot pin 56 as shown by arrow 66. Likewise, the thumb release portion 62 is caused to pivot out of the aperture 24 of the shoulder 22 in a generally outboard direction. Moreover, the temple detent portion 60 of the pawl 16 becomes unseated from its flush position against the outboard side 48 of the temple arm 14 and rides over the projection 46 of the detent end 42 of the temple arm 14. Accordingly, the action of closing the temple arm 14 causes the pawl 16 to gradually fall into detent engagement with the temple arm 14. Moreover, due to the lever-like nature of the pawl 16, the closing of the temple arm 14 actually induces a load in the pawl 16 that urges the pawl 16 into detent engagement with the detent end 42 of the temple arm 14. Specifically, the load on the pawl 16 originates on the inboard portion 58 thereof from the closing of the temple arm 14. The load is transmitted through the thumb release portion 62, through a fulcrum in the form of the pivot pin 56, and manifests itself through the temple detent portion 60 and onto the detent end 42 of the temple arm 14. Preferably, the pawl 16 is composed of a resilient material having springback memory, so that there is forgiving engagement of the temple detent portion 60 into the detent 44 of the temple arm 14. In other words, the flexibility of the pawl 16 renders the pawl 16 forgiving enough such that precision tolerances between the pawl 16 and temple member 14 are not necessary.

Figure 4:
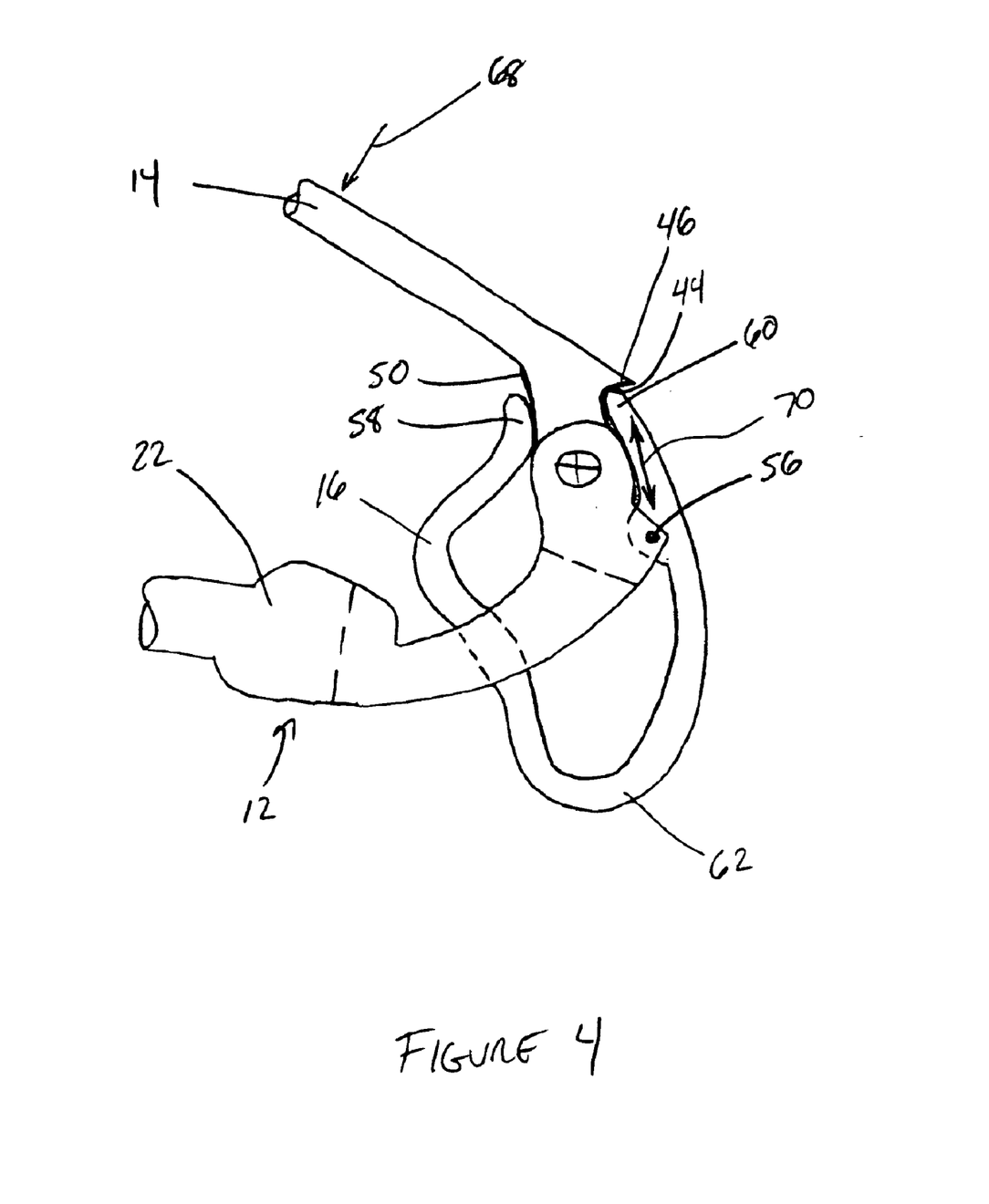
FIG. 4 is a plan view of the spectacles of FIG. 3, illustrating the temple arm biased closed against the lens frame and further illustrating a pawl in locked engagement with the temple arm to maintain the temple arm biased against the lens frame.

FIG. 4 illustrates the temple arm 14 occupying a position wherein a distal end (not shown) of the temple arm 14 is biased against the lens frame 12 under a bias force as depicted by arrow 68, in similar manner as that described in U.S. Pat. Nos. 6,196,682 and 6,679,604, Ser. No. 10/219, 259, filed on Aug. 16, 2002, both of which are incorporated by reference herein. Here, the temple detent portion 60 of the pawl 16 has snapped past the projection 46 of the temple arm 14 and into the detent 44 of the temple arm 14. In this position, the temple detent portion 60 of the pawl 16 is jammed between the detent 44 of the temple arm 14 and the pawl pivot pin 56 so as to impose a force therebetween as depicted by arrow 70, thereby maintaining the temple arm 14 biased against the lens frame 12 under the preload or bias force represented by arrow 68. If further pressure is applied to the temple arm 14 in a direction toward the lens frame 12, then the inboard side 50 of the temple arm 14 would further displace the inboard portion 58 of the pawl 16, thereby further tending to rotate the pawl 16 and, thus, further urging the temple detent portion 60 into further engagement with the detent 44 of the temple arm 14. Accordingly, the temple detent portion 60 tends to stay in the detent 14 of the temple arm 14 given the relatively deep detent as defined by the projection 46 of the temple arm 14. Thus, the pawl 16 is releasable from this detent condition as shown in FIG. 4, by depressing the thumb release portion 62 of the pawl 16.

Figure 5:
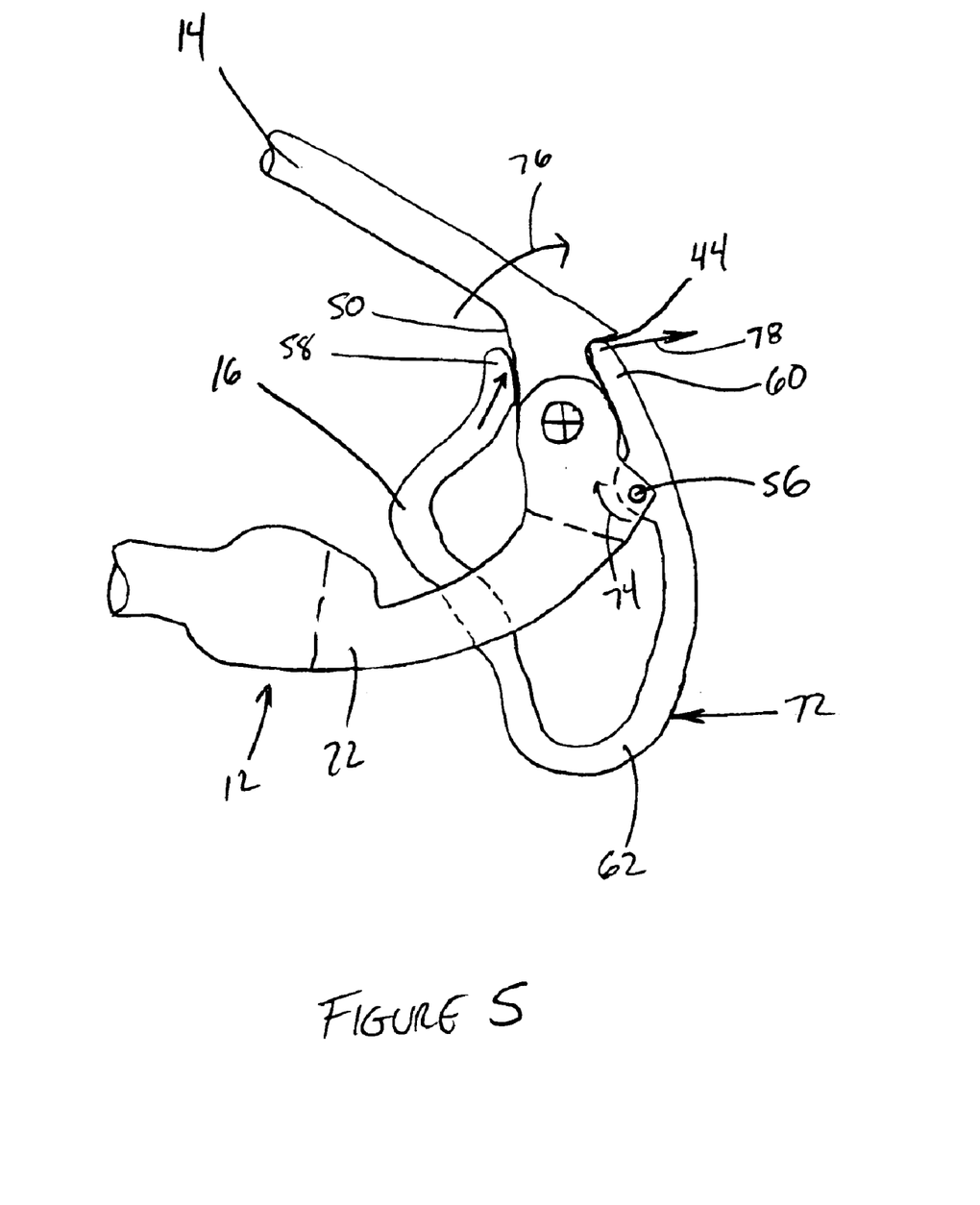
FIG. 5 is a plan view of the spectacles of FIG. 4, illustrating a release force being applied to the pawl so as to pivot the pawl and unseat one end thereof from a detent in the temple arm.

FIG. 5 illustrates a release force as depicted by arrow 72 being applied to the thumb release portion 62 of the pawl 16. The release force tends to spread open the pawl 16 such that the inboard portion 58 and the temple detent portion 60 tend to separate further apart. As a result, the pawl 16 also tends to rotate in a clockwise direction about the pawl pivot pin 56 as shown by arrow 74 thereby urging the inboard portion 58 against the inboard side 50 of the temple arm 14 to cause the temple arm 14 to tend to rotate in a clockwise direction as shown by arrow 76. Application of the release force also acts through the fulcrum of the pivot pin 56 to urge the temple detent portion 60 of the pawl 16 out of the detent 44 of the temple arm 14 as shown by arrow 78. Accordingly, the bias force holding the temple arm 14 in its locked condition with respect to the lens frame 12 is overcome such that the temple arm 14 is unlocked and permitted to rotate toward its open position. Continued application of the release force will continue to urge the inboard portion 58 of the pawl 16 against the inboard side 50 of the temple arm 14 until the temple arm 14 opens completely with respect to the lens frame 12.

Figure 5A:
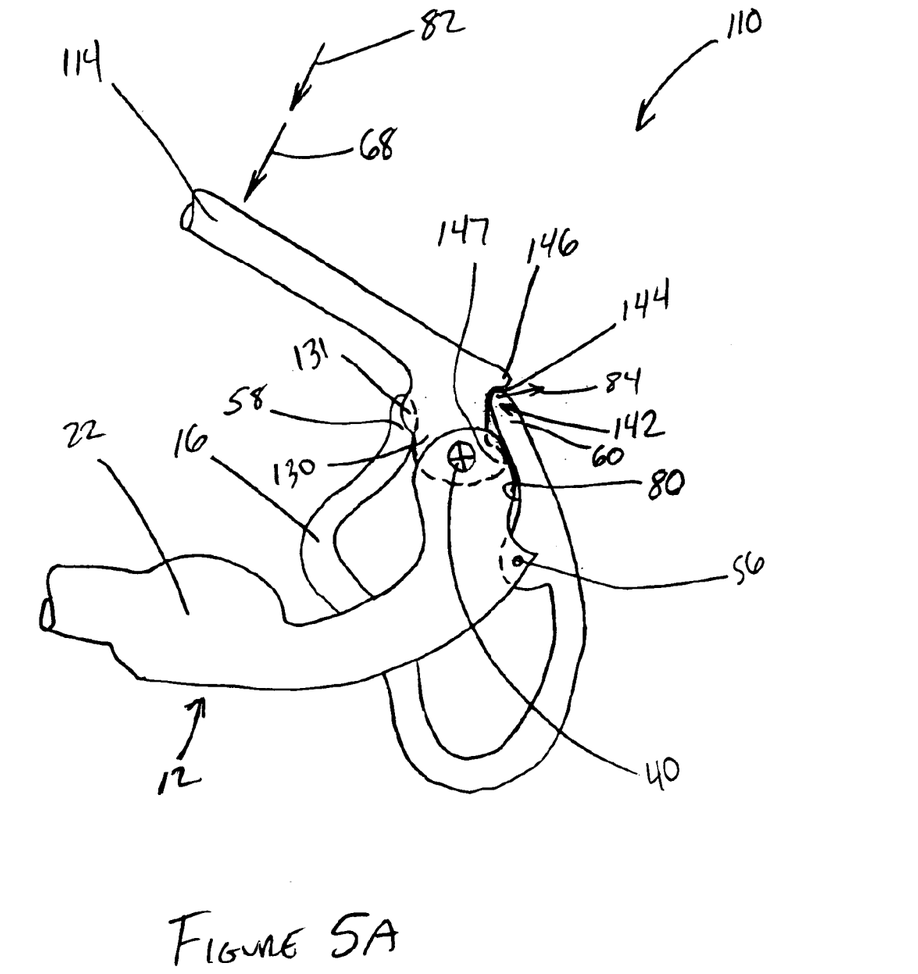
FIG. 5A is a plan view of spectacles that are modified from that of FIG. 5 according to another embodiment of the present invention, illustrating a release force being applied to a temple arm so as to unseat one end of the pawl from a detent of the temple arm.

FIG. 5A illustrates spectacles 110 according to an alternative embodiment in which a temple arm 114 may be unlocked from its biased condition against the lens frame 12. Here, a detent end 142 of the temple arm 114 includes a reduced or relatively smaller projection 146, thereby defining a shallower detent 144. Also, a cam projection 147 extends from the shoulder pivot portion 52 for engaging an inboard surface 86 of the temple detent portion 60 of the pawl 16. Preferably, the cam projection 147 is positioned axially higher than the projection 146, such that the two projections are not aligned in elevation. Also, a temple hinge portion 130 preferably includes a projection 131 for biasing the pawl 16 in a downward manner. Finally, the pawl 16 is preferably mounted to the lens frame 12 in a relatively loose manner at the pivot pin 56 so as to allow pivoting of the pawl 16 in an inboard/outboard direction, but also to allow rocking of the pawl 16 in an up/down direction.

In this embodiment, a further biasing force, as depicted by arrow 82, is imposed on the temple arm 114 in a direction that compresses the temple arm 14 against the lens frame 12 and in a generally downward direction along the axis of the hinge pin 40. In other words, the temple arm 114 is biased in a resultant compound direction toward the lens frame 12. Thus, as the further biasing force is applied, in addition to the preload or locked biasing force 68, the temple arm 114 further pivots or rotates counter-clockwise toward the lens frame 12. As before, the engagement of the temple hinge portion 130 against the inboard portion 58 of the pawl 16, further displaces the inboard portion 58 of the pawl 16 and tends to pivot the pawl 16 as described before. Also, given the inherent flexibility in the temple arm 14, the downward component of the further biasing force urges the projection 131 into downward engagement against the inboard portion 58 of the pawl 16, thereby rocking the pawl 16 about the pawl pivot pin 56, such that the temple detent portion 60 rises out of engagement with the projection 146 of the temple arm 114. Now, however, given the rotation of the temple arm 114 under the biasing forces, the cam projection 147 of the temple arm 114 simultaneously imposes a force on the temple detent portion 60 of the pawl 16 that is sufficient to deflect the temple detent portion 60 and thereby further disengage the temple detent portion 60 out of the detent 144 of the temple arm 114.

Accordingly, the present invention provides a hinge and pawl arrangement whereby the temple arm 114 may be urged into a locked detent position with respect to the lens frame 12 by application of a first biasing force 68 on the temple arm 114 toward the lens frame 12. Under application of the first biasing force 68, the temple detent portion 60 of the pawl 16 falls into the detent 144 in the temple arm 114 before the cam projection 147 has an opportunity to engage the inboard surface 86 of the temple detent portion 60 of the pawl 16. The temple arm 114 may be unlocked from the locked detent position by application of a second, relatively greater biasing force 82 on the temple arm 114 that is applied in the same direction as the first biasing force 68. Under application of the second biasing force 82, the cam projection 147 engages the inboard surface 86 of the temple detent portion 60 to bend it in an outboard direction and pop it out of detent engagement as shown by arrow 84.

Figure 6:
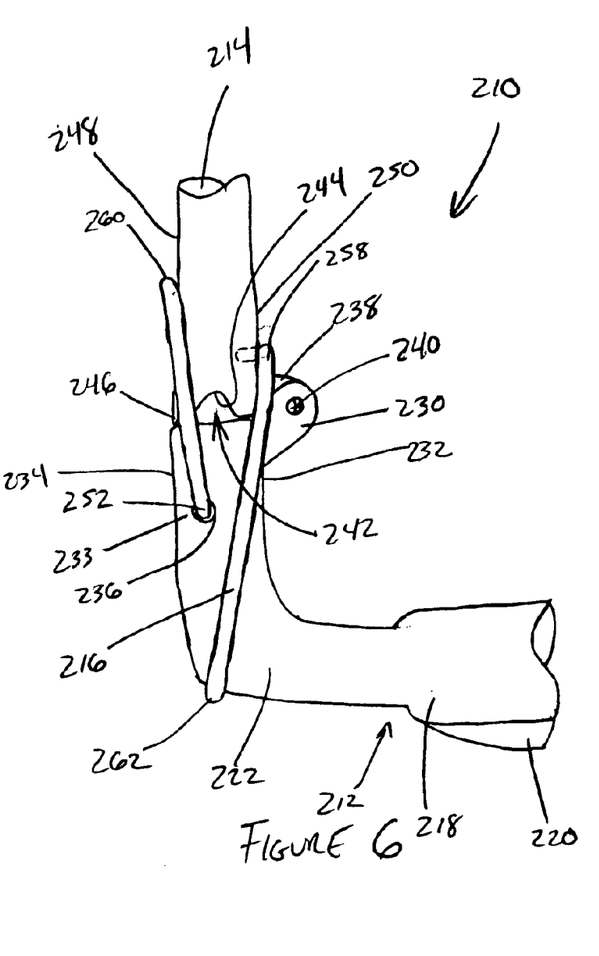
FIG. 6 is a plan view of spectacles according to another embodiment of the present invention, illustrating a temple arm in an open position with respect to a lens frame.
Figure 7:
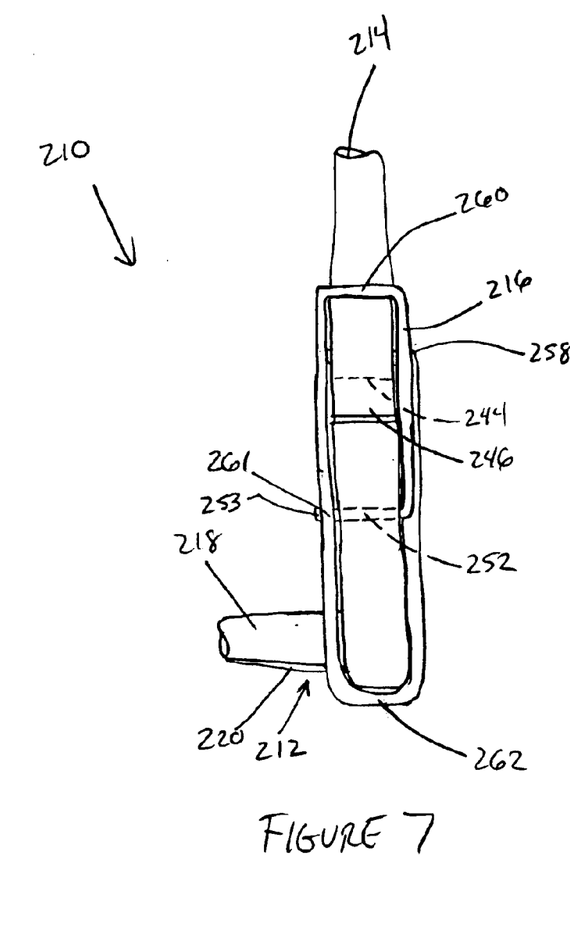
FIG. 7 is a side view of the spectacles of FIG. 6.

FIGS. 6 through 9 illustrate spectacles 210 according to another embodiment of the present invention. Many of the details of the present embodiment are identical to those described above and will not be repeated hereafter. FIGS. 6 and 7 illustrate a top or plan view of the spectacles 210 in a substantially open position including a lens frame 212, a temple arm 214 pivotably mounted to the lens frame 212, and a pawl 216 pivotably mounted to the lens frame 212. Like the previous embodiments, the pawl 216 is uniquely adapted to automatically fall into detent engagement with the temple arm 214 as the temple arm 214 is swung closed toward and compressed against the lens frame 212.

The lens frame 212 includes a rim 218, a lens 220 mounted within the rim 218, and a shoulder 222 extending in an outboard direction from the rim 218. The shoulder 222 may be a separate portion that is welded to the rim 218, or may integrally extend from the rim 218, or the like. The shoulder 222 further includes a temple hinge portion 230 proximate a generally inboard side 232 of the shoulder 222 and further includes a pawl pivot portion 233 proximate a generally outboard side 234 of the shoulder 222 that is generally distal with respect to the rim 218. The pawl pivot portion 233 includes a hole 236 formed therethrough for accepting the pawl 216 therein.

The temple arm 214 includes a shoulder hinge portion 238 pivotably mounted to the temple hinge portion 230 of the shoulder 222 of the lens frame 212. A screw, shaft, or any other type of hinge pin 240 connects the temple arm 214 to the lens frame 212. Alternatively, a separate hinge member is not necessary to pivotably mount the temple arm 214 to the lens frame 212. Rather, the temple arm 214 may be integrally pivotably mounted to the lens frame 212 if desired. In any case, the temple arm 214 also includes a detent end 242 having a detent 244 formed therein and at least partially defined by a protrusion or projection 246. The temple arm 214 further includes an outboard side 234 and an inboard side 248 of the temple arm 250.

The pawl 216 originates in the form of a shoulder pivot portion 252 that extends into the hole 236 of the pawl pivot portion 233 of the lens frame 212. The pawl 233 extends rearwardly from the shoulder pivot portion 252 and bends downwardly in the form of a temple detent portion 260 positioned outboard of the temple arm 214. The pawl 216 bends back and extends in a generally forward direction underneath part of the temple arm 214 and the shoulder 222 in the form of a release lever portion 261. The release lever portion 261 rests on an outboard side of the shoulder pivot portion 252 proximate an end 253 thereof, as best shown in FIG. 7. The pawl 216 then bends and extends upwardly to define a thumb release portion 262, from which the pawl 216 bends and extends generally rearwardly over the shoulder 222 and terminates in another bend and extension that defines an inboard portion 258 of the pawl 216 that engages the inboard side 250 of the temple arm 214 at a location rearward of the hinge pivot axis, but forward of the temple detent portion 260.

Figure 8:
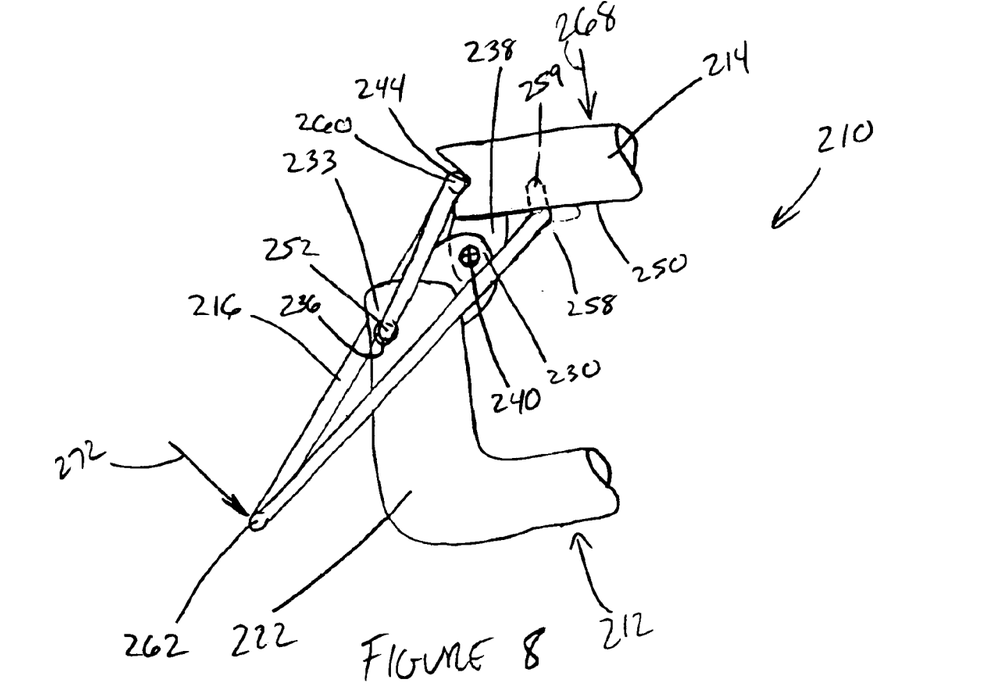
FIG. 8 is a plan view of the spectacles of FIG. 6, illustrating the temple arm biased closed against the lens frame and further illustrating a pawl in locked engagement with the temple arm to maintain the temple arm biased against the lens frame.
Figure 9:
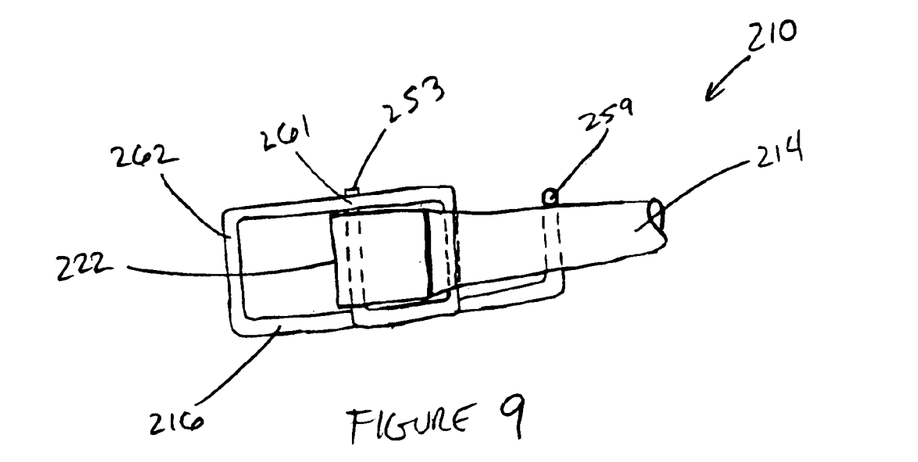
FIG. 9 is a rear view of the spectacles of FIG. 8.

FIGS. 8 and 9 illustrate the spectacles 210 in a closed and locked position in which a distal end (not shown) of the temple arm 214 is biased against the lens frame 212 under a bias force, as described previously and as depicted by arrow 268. The pawl 216 maintains the temple arm 214 biased against the lens frame 212 under the bias force 268. Here, the temple arm 214 has been pivoted clockwise such that the inboard side 250 of the temple arm 214 has displaced the inboard portion 258 of the pawl 216 so as to pivot the pawl 216 about the shoulder pivot portion 252 until the temple detent portion 260 of the pawl 216 falls into the detent 244 in the temple arm 214 as shown. Accordingly, as the temple arm is closed, the pawl 216 automatically swings and falls into detent engagement with the temple arm 214. In this position, a portion of the pawl 216 is jammed between the detent 244 of the temple arm 214 and the shoulder pivot portion 252 so as to impose a force therebetween, thereby maintaining the temple arm 214 biased against the lens frame 212. If further pressure is applied to the temple arm 214 in a direction toward the lens frame 212, then the inboard side 250 of the temple arm 214 would further displace the inboard portion 258 of the pawl 216, thereby further tending to rotate the pawl 216 and, thus, further urging the temple detent portion 260 into further engagement with the detent 244 of the temple arm 214. The temple detent portion 260 tends to stay in the detent 244 of the temple arm 214 given the relatively deep detent as defined by the projection 246 of the temple arm 214, as well as the inherent spring force of the pawl 216 under load. As with the embodiment of FIGS. 1 through 5, the pawl 216 is releasable from the detent condition by applying a release force depicted by arrow 272, such as by depressing the thumb release portion 262 of the pawl 216 in a direction toward the lens frame. The release force acts through the fulcrum established by the shoulder pivot portion 252 and urges the temple detent portion 260 of the pawl 216 out of the detent 244 of the temple arm 214.

While the present invention has been described in terms of a limited number of embodiments, it is apparent that other forms could be adopted by one skilled in the art. In other words, claim elements are not limited to the imperfections of the exact language used, but encompass as well other structure that fulfills the same functional purpose. In other words, the teachings of the present invention encompass any reasonable substitutions or equivalents of claim limitations. For example, the structure, materials, sizes, and shapes of the individual components could be modified, or substituted with other similar structure, materials, sizes, and shapes. Those skilled in the art will appreciated that the male/female design of the temple detent portion of the pawl and the detent of the temple arm respectively, may be reversed. In other words, the temple arm may include a male feature that snaps into a female detent feature of the pawl. Accordingly, the scope of the present invention is to be limited only by the following claims.

We claim:

1. Spectacles including:

a lens frame having a shoulder;

a temple arm pivotably mounted to said shoulder of said lens frame, said temple arm having an inboard side, an outboard side, and a detent end having a detent; and a pawl pivotably mounted to said shoulder of said lens frame, said pawl having an inboard portion adapted for contact with said inboard side of said temple arm, said pawl further having a temple arm detent portion adapted for engagement with said detent of said temple arm to lock said temple arm against said lens frame in a locked position whereby said temple arm establishes a predetermined load on said lens frame for pinching an item therebetween.

2. The spectacles as claimed in claim 1, wherein said temple arm further includes a cam projection adapted for engagement with said temple detent portion of said pawl to deflect said temple detent portion out of said detent of said temple arm upon application of a release force on said temple arm toward said lens frame when said temple arm occupies said locked position.

3. The spectacles as claimed in claim 1, wherein said shoulder of said lens frame includes an aperture formed therethrough, further wherein said pawl is generally U-shaped and extends internally through said shoulder through said aperture.

4. The spectacles as claimed in claim 1, wherein said pawl takes the form of bent wire and extends externally over said shoulder.

5. Spectacles that clip to an article, said spectacles including:

a lens frame having a shoulder with a temple hinge portion and a pawl hinge portion positioned forward and outboard of said temple hinge portion;

a temple arm having a shoulder hinge portion pivotably mounted to said temple hinge portion of said lens frame thereby defining a hinge pivot axis, said temple arm being pivotable closed against said lens frame under a bias force, said temple arm further having an inboard side, an outboard side, and a detent end having a detent; and a pawl having a shoulder hinge portion pivotably mounted to said pawl hinge portion of said lens frame, said pawl further having an inboard portion adapted for contact with said inboard side of said temple arm at a location rearward of said hinge pivot axis when said temple arm occupies a substantially open position with respect to said lens frame, said pawl also having a temple detent portion positioned outboard of said temple arm, said pawl further having a thumb release portion between said follower and temple detent portions;

wherein pivoting said temple arm closed against said lens frame displaces said inboard portion of said pawl, thereby pivoting said pawl and causing said temple detent portion to engage said detent of said temple arm, whereby said temple arm locks against said lens frame under said bias force.

6. The spectacles as claimed in claim 5, wherein said temple arm further includes a cam projection adapted for engagement with said temple detent portion of said pawl to deflect said temple detent portion out of said detent of said temple arm upon application of a release force on said temple arm toward said lens frame when said temple arm occupies said locked position.

7. The spectacles as claimed in claim 5, wherein said shoulder of said lens frame includes an aperture formed therethrough, further wherein said pawl is generally U-shaped and extends internally through said shoulder through said aperture.

8. The spectacles as claimed in claim 5, wherein said pawl takes the form of bent wire and extends externally over said shoulder.

* * * * *